Nov. 10, 1942.   H. G. BERSIE   2,301,800
METHOD OF MAKING PANELS CONTAINING CONDUITS
Filed May 5, 1941
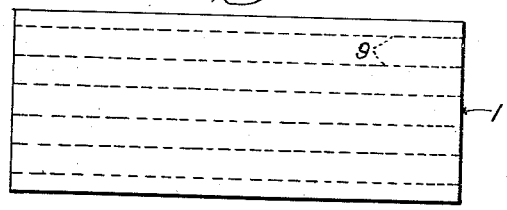
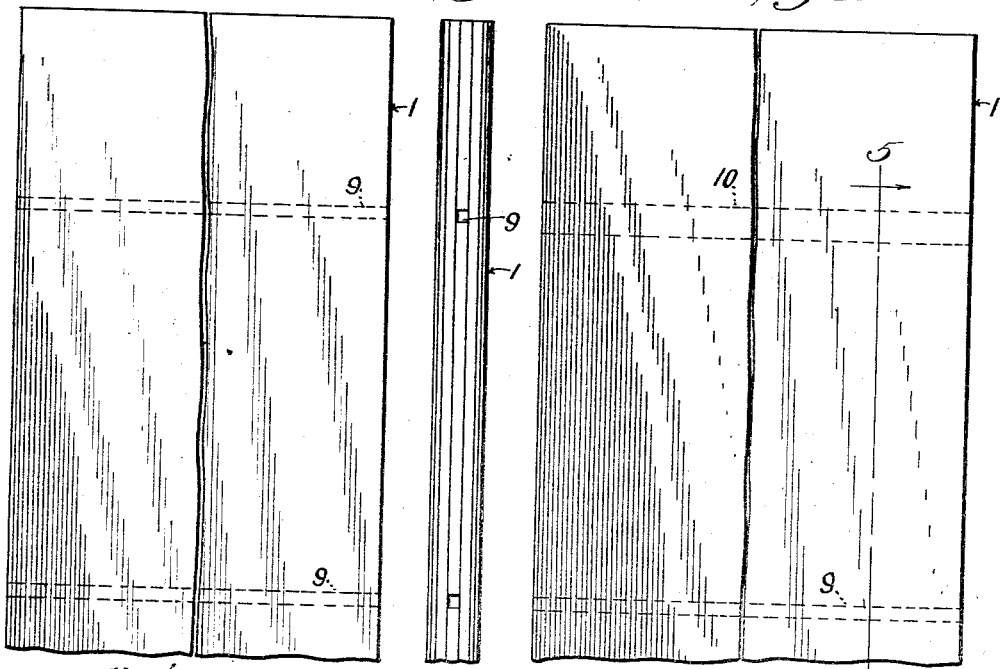
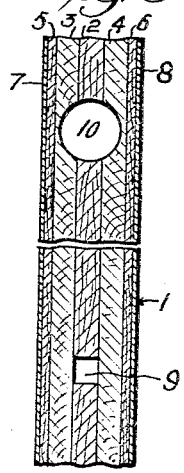
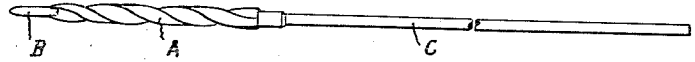
Inventor:
Hugh G. Bersie,
By Wm F. Freudenreich,
Atty.

Patented Nov. 10, 1942

2,301,800

UNITED STATES PATENT OFFICE 2,301,800

METHOD OF MAKING PANELS CONTAINING CONDUITS

Hugh G. Bersie, Wilmette, Ill., assignor to Haskelite Manufacturing Corporation, a corporation of New York Application May 5, 1941, Serial No. 391,936

3 Claims. (Cl. 144—309)

Laminated panels, particularly those containing a plywood core and metal facings bonded thereto are largely used for partitions in places where partitions must be thin and light. In some installations as, for example, interior partitions for Pullman cars, it is necessary to carry some of the electric wiring along the partitions. If this wiring is to be concealed without the use of housings or coverings secured to the exteriors of the partitions, this can only be done by providing the necessary conduits in the interiors of the partitions themselves.

The object of the present invention is to make it possible to provide relatively thin multi-ply panels with tunnels or conduits extending through the interiors thereof for the reception of electric wires.

In accordance with my invention, I so manufacture a panel that an inner ply of a group of three or more contains a gap extending across the entire length or breadth of the panel and having a width approximately equal to the thickness of that ply. In this simple manner, the panel is provided with a small square tunnel extending through the same from edge to edge, parallel with the faces of the panel. Such holes or tunnels, because of the necessary thinness of the ply which may contain them, are too small for most purposes. However, they serve admirably as lead holes for long drills or augers provided with non-cutting tips or pilots that can freely enter them. Therefore, after the panels have been completed, with the rudimentary conduits within the same, it becomes a simple matter to bore out the conduits to the desired size, without danger that the drill or auger will depart from a straight path paralleling the faces of a panel.

If it were known at the time of making a panel exactly where a conduit or conduits must be located, when the panel is placed in its final position of use, the required conduit or conduits could be completed at the place of manufacturing the panel. However, in order to make a panel adaptable to various situations, I prefer so to construct the panels initially that each will contain a plurality of lead holes distributed over the length or breadth of the same. This will provide a lead hole close enough to any point where a conduit may be required, to satisfy all likely demands. Then, because of the ease with which the little square tunnels or rudimentary conduits may be enlarged, the workman at the place of installation can readily enlarge any little tunnel or lead hole that may be needed. Since, in many cases, the wires that enter at one edge of a panel need extend only to an outlet somewhere along the conduit in which they lie, the lead hole which is to be transformed into a full size conduit need be bored out only far enough to extend to or a little past the outlet.

The various features of novelty whereby my invention is characterized will hereinafter be pointed out with particularity in the claims; but, for a full understanding of my invention and of its objects and advantages, reference may be had to the following detailed description taken in connection with the accompanying drawing wherein:

Figure 1 is a face view of a panel embodying the present invention; Fig. 2 is a view similar to Fig. 1, showing only a fragment of the panel, but on a much larger scale; Fig. 3 is an edge view of so much of the panel as appears in Fig. 2; Fig. 4 is a view similar to Fig. 2, illustrating the panel after one of the lead holes has been enlarged; Fig. 5 is a section on line 5—5 of Fig. 4; and Fig. 6 is an elevation showing, on a small scale, a bit or auger suitable for boring out the conduits.

In the drawing there is illustrated a commercial panel I, which actually is thirty-six inches wide, eighty-four inches long, and three-quarters of an inch thick. As best shown in Fig. 5, the panel comprises a body member composed of five wood plies 2, 3, 4, 5 and 6, and two metal facings 7 and 8 bonded to the body member, the ply 2 being in the center. In the particular example given, the ply 2 is one-eighth of an inch thick. Except so far as the central ply is concerned, there is no difference between the manufacture of this panel and any ordinary panel of the same type that does not need to contain any conduits.

Instead of having a central ply that is continuous as are the others, I make this ply in sections. If only a single conduit is required, the ply 2 is made in two sections which, when placed edge to edge, are one-eighth of an inch shorter than the panel or, rather, the sections are of such length that when they are spaced one-eighth of an inch apart upon being assembled with the rest of the plies, there will be no unnecessary waste in trimming. If more than one complete or rudimentary conduit is required, then the number of sections of which the divided ply is composed is equal to the number of conduits plus one. In the example given, there are six rudimentary conduits or lead holes, indicated by the dotted lines 9 in Fig. 1, extending across the length of the panel parallel to each other and six inches apart; the two extreme lead holes being spaced three inches from the long edges of the panel. Consequently, when the panel is completed, it contains six parallel tunnels square in cross section, extending throughout the entire length of the panel. In the larger views the tunnels or lead holes are indicated by the same reference character as in Fig. 1.

In order to transform one of the little tunnels or lead holes into a conduit of satisfactory size, it need only be enlarged by means of a suitable drill or auger of which an example is shown in Fig. 6. Thus, this drill or auger may comprise a boring member proper A whose diameter corresponds to that of the conduit to be made, a non-boring tip or pilot B small enough in diameter freely to enter one of the tunnels, and a long shank C. The tip or pilot on the drill or auger should be long enough to make certain that the boring elements of the tool will be accurately guided as the drilling or boring progresses.

In a panel as thick as the one in the example given, the diameter of the round hole or conduit 10 resulting from drilling or boring may be a half-inch or more without weakening the panel; thereby providing an abundance of space for the reception of wires leading to a lamp or thermostat mounted on a face of the panel or simply to an outlet to which electrical apparatus of one kind or another may be attached.

It will thus be seen that by my invention multi-ply panels with plywood interiors can easily and at small expense be adapted to provide internal conduits for wires or cables which it is desired to conceal. This not only affords the best kind of protection for the wires or cables, but, because of the absence of exterior conduits on a wall or partition, adds to the attractiveness of the latter and makes it easier to keep the same clean. Furthermore, although panels containing the required conduits cost a little more than plain panels, there is compensation for the extra cost in the elimination of the external conduits which would otherwise be needed. It will be understood that usually thin metal tubes (not shown) known as "conduits" are inserted in the enlarged holes or tunnels, the wires being threaded through these tubes.

While I have illustrated and described with particularity only a single multi-ply panel and the preferred method of manufacturing it and making it ready for use to receive electric wires within the same and conceal them, I do not desire to be limited to the details thus illustrated and described; but intend to cover all constructions and series of operations coming within the definitions of my invention constituting the appended claims.

I claim:

1. The method of producing a panel having a round tunnel extending through the same from edge to edge and parallel with the faces of the panel, which consists in making a panel containing at least three plies of which an inner ply contains a gap extending from edge to edge of the panel and about as wide as that ply is thick, thereby providing the panel with a square lead hole extending through the same between said edges, then, employing said lead hole to guide a non-boring pilot carried on the end of a drill of the required diameter, enlarging the lead hole and making it round in cross-section, and inserting a metal conduit in said enlarged hole.

2. The method of producing a panel having a round tunnel extending through the same from edge to edge and parallel with the faces of the panel, which consists in making a panel having a plywood body member and thin metal facings and, in the making of the panel, introducing the central ply in sections spaced apart to provide between them a square lead hole for a drill or auger extending from one of the aforesaid edges of the panel to the other; and then, employing said lead hole to guide a non-boring pilot on the end of and rotatable with a drill, enlarging the lead hole into the form of a cylindrical tunnel of greater diameter than the greatest transverse dimension of the lead hole.

3. The method of producing a panel having a round tunnel extending through the same from edge to edge and parallel with the faces of the panel, which consists in making a panel having a plywood body member and thin metal facings and, in the making of the panel, introducing the central ply in sections spaced apart to provide between them a plurality of parallel lead holes for a drill or auger extending from one of the aforesaid edges to the other; and then employing one or more of said lead holes to guide a non-boring pilot on the end of a drill, enlarging such hole or holes to produce a cylindrical tunnel of a diameter equal to more than twice the thickness of the sectional ply.

HUGH G. BERSIE.